(12) United States Patent
Yang

(10) Patent No.: US 9,693,108 B2
(45) Date of Patent: Jun. 27, 2017

(54) METHOD AND SYSTEM FOR DISPLAYING USER SELECTABLE PICTURE

(71) Applicant: Electronics and Telecommunications Research Institute, Daejeon (KR)

(72) Inventor: Hoe Sung Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 713 days.

(21) Appl. No.: 13/907,159

(22) Filed: May 31, 2013

(65) Prior Publication Data

US 2013/0332958 A1     Dec. 12, 2013

(30) Foreign Application Priority Data

Jun. 12, 2012   (KR) .................. 10-2012-0062790
Dec. 14, 2012   (KR) .................. 10-2012-0146681

(51) Int. Cl.
| | |
|---|---|
| H04N 21/482 | (2011.01) |
| H04N 7/18 | (2006.01) |
| H04N 21/2187 | (2011.01) |
| H04N 21/431 | (2011.01) |
| G01S 3/786 | (2006.01) |

(52) U.S. Cl.
CPC ......... *H04N 21/482* (2013.01); *G01S 3/7864* (2013.01); *H04N 7/18* (2013.01); *H04N 21/2187* (2013.01); *H04N 21/431* (2013.01)

(58) Field of Classification Search
CPC .... H04N 21/482; H04N 7/18; H04N 21/2187; H04N 21/431; G01S 3/7864
USPC .................................. 725/139, 37, 38
See application file for complete search history.

(56) References Cited

U.S. PATENT DOCUMENTS

| | | | | |
|---|---|---|---|---|
| 4,286,289 A | * | 8/1981 | Ottesen ................. | G01S 3/7864 341/20 |
| 5,729,471 A | * | 3/1998 | Jain ........................ | H04N 5/222 345/419 |
| 2003/0023974 A1 | * | 1/2003 | Dagtas ............... | H04N 7/17318 725/47 |
| 2003/0197785 A1 | * | 10/2003 | White ................... | G11B 27/034 348/207.99 |
| 2006/0119703 A1 | * | 6/2006 | Hibi ...................... | H04N 7/181 348/143 |
| 2007/0040918 A1 | * | 2/2007 | Kondo ..................... | G06T 5/50 348/241 |
| 2008/0300784 A1 | * | 12/2008 | Kleinstern ............. | G01C 21/28 701/431 |
| 2009/0010491 A1 | * | 1/2009 | Ko ......................... | G06F 3/0481 382/103 |

(Continued)

FOREIGN PATENT DOCUMENTS

| | | |
|---|---|---|
| KR | 10-2002-0064888 A | 8/2002 |
| KR | 10-2008-0051444 A | 6/2008 |

(Continued)

*Primary Examiner* — Nathan Flynn
*Assistant Examiner* — Caroline Somera
(74) *Attorney, Agent, or Firm* — Rabin & Berdo, P.C.

(57) ABSTRACT

Provided is a method and system for displaying a user selectable picture that enables a user to select a predetermined object from a picture of a camera relayed in real time, and to actively select and thereby view a picture captured to include the selected object.

14 Claims, 2 Drawing Sheets

(56) References Cited

U.S. PATENT DOCUMENTS

| | | | | |
|---|---|---|---|---|
| 2009/0195371 A1* | 8/2009 | Camus | ............... | B60R 21/013 |
| | | | | 340/435 |
| 2010/0026721 A1* | 2/2010 | Park | ............... | G06F 3/0481 |
| | | | | 345/660 |
| 2010/0026894 A1* | 2/2010 | Osawa | ............... | H04N 5/44591 |
| | | | | 348/564 |
| 2010/0054694 A1* | 3/2010 | Liu | ............... | G11B 27/034 |
| | | | | 386/285 |
| 2012/0169882 A1* | 7/2012 | Millar | ............... | H04N 7/181 |
| | | | | 348/159 |
| 2013/0036438 A1* | 2/2013 | Kutaragi | ............... | H04N 21/2743 |
| | | | | 725/38 |
| 2013/0135344 A1* | 5/2013 | Stirbu | ............... | G06F 17/30893 |
| | | | | 345/629 |
| 2014/0327676 A1* | 11/2014 | House | ............... | G06T 15/20 |
| | | | | 345/427 |

FOREIGN PATENT DOCUMENTS

| KR | 10-2009-0002810 A | 1/2009 |
|---|---|---|
| KR | 10-2009-0131811 A | 12/2009 |
| KR | 10-2010-0001373 A | 1/2010 |
| KR | 10-2010-0121614 A | 11/2010 |

* cited by examiner

< POSITION MAP INFORMATION >

METHOD AND SYSTEM FOR DISPLAYING USER SELECTABLE PICTURE

CROSS-REFERENCE TO RELATED APPLICATIONS

This application claims the priority benefit of Korean Patent Application No. 10-2012-0062790, filed on Jun. 12, 2012, in the Korean Intellectual Property Office, and Korean Patent Application No. 10-2012-0146681, filed on Dec. 14, 2012, in the Korean Intellectual Property Office, the disclosures of which are incorporated herein by reference.

BACKGROUND

1. Field of the Invention

Embodiments of the present invention relate to a method and system for displaying a user selectable picture that enables a user to select a predetermined object from a picture of a camera relayed in real time, and to actively select and thereby view a picture captured to include the selected object.

2. Description of the Related Art

In the conventional relay broadcasting, a plurality of items of picture information collected using a plurality of cameras may be collectively collected at a control center of a broadcasting station, and predetermined picture information (hereinafter, "edited picture information") selected by, for example, a producer from among the plurality of items of picture information may be collectively broadcasted to the respective viewers.

Specifically, in the conventional relay broadcasting, a viewer may passively view edited picture information unilaterally broadcasted from a broadcasting station, and the viewer may have no right to select a screen and thus, may utilize only a limited broadcasting service.

Accordingly, there is a need for technology that enables a user to actively select a desired picture from among a plurality of broadcasting pictures that includes a predetermined object, and thereby view the selected picture.

SUMMARY

An aspect of the present invention provides a method and system for displaying a user selectable picture that enables a user to select a predetermined object from a picture of a camera relayed in real time, and to select and thereby view a relay picture that includes the selected object.

Another object of the present invention also provides a method and system for displaying a user selectable picture that enables a user to select an object that the user desire to view and also enables a selection of a picture including the selected object to be smoothly performed by tracking a position of each of objects that are included in a picture, and displaying the tracked positions on a screen in real time.

Another object of the present invention also provides a method and system for displaying a user selectable picture that enables a user to view picture information actively selected by the user, instead of viewing edited picture information unilaterally broadcasted from a broadcasting station, and thereby maximally guarantee a screen selection of the user.

According to an aspect of the present invention, there is provided a method of displaying a user selectable picture, the method including: extracting an object from picture information that is generated using a plurality of cameras; assigning an identifier (ID) to the extracted object; classifying the picture information based on the assigned ID; tracking a position of the object based on the classified picture information; and displaying, on at least a portion of a screen, position map information that maps the tracked position.

According to another aspect of the present invention, there is provided a method of displaying a user selectable picture, the method including: identifying picture information including a first selected object from among a plurality of items of picture information that are generated using a plurality of cameras; tracking a position of the first selected object based on the identified picture information; and displaying, on at least a portion of a screen, position map information that maps the tracked position.

According to still another aspect of the present invention, there is provided a system for displaying a user selectable picture, the system including: an object extractor to extract an object from picture information that is generated using a plurality of cameras; a position tracker to assign an ID to the extracted object, to classify the picture information based on the assigned ID, and to track a position of the object based on the classified picture information; and a display controller to display, on at least a portion of a screen, position map information that maps the tracked position.

According to yet another aspect of the present invention, there is provided a system for displaying a user selectable picture, the system including: a picture extractor to identify picture information including a first selected object from among a plurality of items of picture information that are generated using a plurality of cameras; a position tracker to track a position of the first selected object based on the identified picture information; and a display controller to display, on at least a portion of a screen, position map information that maps the tracked position.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
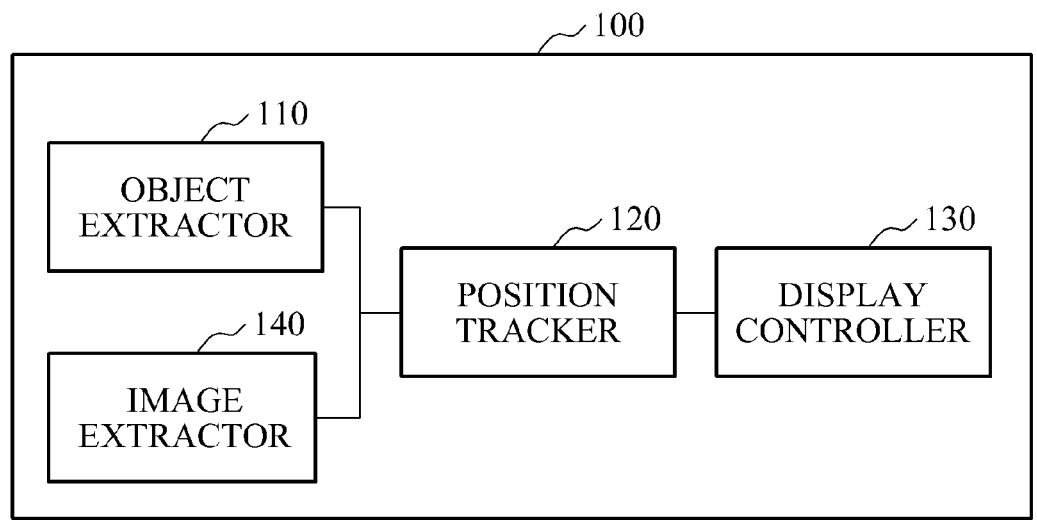
FIG. 1 is a block diagram illustrating a system for displaying a user selectable picture according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, various embodiments of the present invention will be described with reference to the accompanying drawings, but the present invention is limited thereto or restricted thereby.

The term "object" used throughout the present specification is an object to be photographed, and may refer to an external object, for example, an organic body such as a human and an animal, a moving body, and a fixing body, on which a gazing focus of a camera is formed. In particular, the term "object" may indicate an object that is included in picture information and has a value as information. For example, in picture information generated by a camera photographing a soccer game, an object may be a soccer player who participates in the soccer game.

Picture information generated through a camera may include a primary object and a sub-object captured together with the primary object.

Accordingly, a system for displaying a user selectable picture according to an embodiment of the present invention may classify a plurality of items of picture information based on individual objects, regardless of a primary object and a sub-object, and thereby provide an environment capable of tracking a path via which a predetermined object moves, based on the classified picture information.

FIG. 1 is a block diagram illustrating a system 100 for displaying a user selectable picture according to an embodiment of the present invention.

Referring to FIG. 1, the user selectable displaying system 100 may include an object extractor 110, a position tracker 120, and a display controller 130.

The object extractor 110 may extract an object from picture information generated using a plurality of cameras. That is, the object extractor 110 serves to identify an object included in picture information.

For example, the object extractor 110 may extract an object, such as player A, player B of an opponent team who blocks the player A, and player C of the same team who is waiting for a ball to be passed from the player A, from picture information that is captured based on the player A who is holding the ball in a soccer game and thereby is generated.

A scheme of extracting an object from picture information may include, for example, an extraction scheme using contour information of an object, an extraction scheme using a major feature point of an object, an extraction scheme based on a three-dimensional (3D) model or an area, and the like. The object extractor 110 may extract an object from picture information by appropriately employing the above known schemes.

The position tracker 120 may assign an identifier (ID) to the extracted object, and may classify picture information based on the assigned ID. The position tracker 120 serves to generate an integrated map by sorting position information of all of the objects based on object information extracted from a plurality of items of information that are collected.

As described above, the position tracker 120 may assign the ID to the extracted object, and may classify picture information based on the assigned ID.

In this instance, the position tracker 120 may perform sorting and classification processing based on a time at which corresponding picture information is generated.

According to another embodiment, the position tracker 120 may assign an individual ID to object information that is extracted from a plurality of items of picture information, and may perform sorting and classification processing based on information of the individual ID.

For example, based on the assumption that first picture information including players A and B as objects and second picture information including players A and C as objects are generated in the aforementioned soccer game, the position tracker 120 may sort and thereby classify the generated picture information based on a generation order, or may assign IDs A, B, and C to the players A, B, and C, respectively, and may separately manage only a picture assigned with the ID "A".

In addition, the position tracker 120 may track a position of the object based on the classified picture information. That is, with respect to picture information that is sorted for each generation time or each ID, the position tracker 120 may specify position coordinates of the object with respect to each of the sorted picture information based on a photographing point of the camera, and may track the position of the object based on the specified position coordinates.

For example, referring to the aforementioned soccer game, the position tracker 120 may determine, as (1024, 1024), a position of the player A within the first picture information that is relatively initially generated, and may determine, as (−1024, −1024), a position of the player A within the second picture information. Based thereon, the position tracker 120 may track the position of the player A that the player A has moved the position from coordinates (1024, 1024) to coordinates (−1024, −1024).

Here, the position tracker 120 may set, for each picture information, a virtual coordinate system using, as an origin, a photographing point of a camera or a feature point, for example, a landmark in predetermined picture information, and may determine coordinates of the player A in the set coordinate system.

As another example, the position tracker 120 may track the position of the object based on position information input from a position tracking apparatus attached to each object. Here, the position tracking apparatus may use a wireless communication.

Depending on embodiments, the position tracker 120 may track a position of an object by classifying the object. For example, the position tracker 120 may track the position of the object by classifying an object based on a color that is determined in consideration of a group including the object. That is, the position tracker 120 may classify a plurality of objects for each group, and may classify and thereby track a position of a corresponding object based on a color assigned to each group.

For example, in the aforementioned soccer game, the position tracker 120 may classify objects, for example, the players A and C into the same group of the same team, and may classify an object, for example, the player B into a different group. Further, the position tracker 120 may track positions of the players A and C based on red that is assigned to the group into which the players A and C are classified. The position tracker 120 may track a position of the player B based on yellow that is assigned to the group into which the player B is classified.

The display controller 130 may display, on at least a portion of a screen, position map information that maps the tracked position of the object. That is, the display controller 130 serves to display a real-time position relationship between objects on the screen as position map information.

In this instance, the display controller 130 may display the position map information on the screen in a picture in picture (PIP) form or a split screen, for example, a screen split form. Accordingly, the display controller 130 may display the position map information on the screen, and thereby enables the user to continuously recognize the real-time position relationship between objects.

Figure 2:
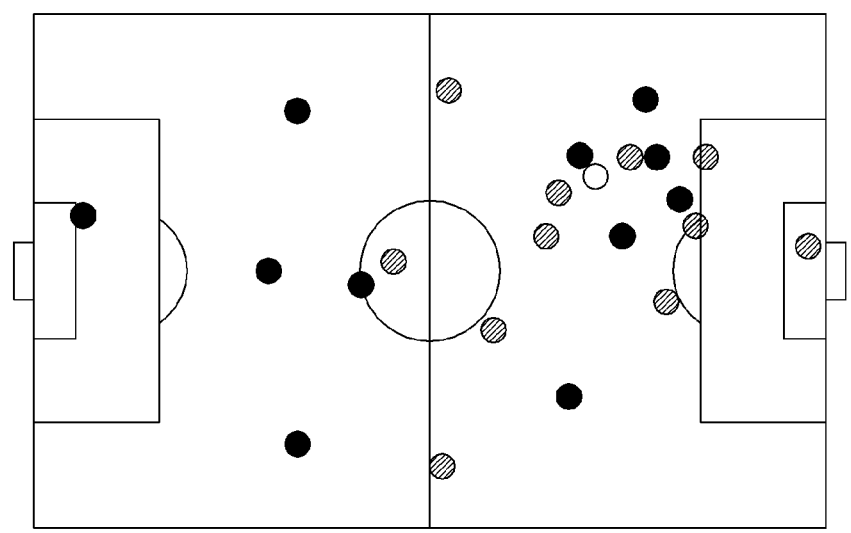
FIG. 2 is a diagram illustrating an example of position map information.

FIG. 2 is a diagram illustrating an example of position map information.

FIG. 2 illustrates an example in which a plurality of objects extracted from picture information generated in association with a soccer game is classified into three groups based on a team.

The position tracker 120 may classify, into group I, an object belonging to the same team as a player A, including the aforementioned player C, and may assign red to the group I.

Also, the position tracker 120 may classify, into group II, objects including a player B which belongs to a team different from the team of the player A, and may assign yellow to the group II.

Also, the position tracker 120 may classify, into group III, an object, for example, a referee, which belongs to none of the groups I and II, and may assign white to the group III.

The position tracker 120 may determine position coordinates by tracking a position of each of the objects belonging to each group.

The display controller 130 may generate position map information of FIG. 2 in which a position of an object is classified for each group color based on the determined position coordinates.

For example, position map information of FIG. 2 may identify a position within a soccer playground through icons that are color-based classified for each team by classifying each of the players and the referee who are participating in the soccer game. That is, FIG. 2 illustrates position map information in which objects of the group I assigned with red are moving to attack and in response thereto, objects of the group II assigned with yellow are moving to defend, the object of the group III assigned with white is moving to act as referee.

Therefore, according to an embodiment of the present invention, a user is enabled to clearly view a position of an object that the user desires to monitor by generating position map information about current positions of objects and by displaying the generated position map information on a screen of a terminal viewed by the user.

According to an expanded embodiment, the display controller 130 may display, on at least another portion of the screen, picture information that is classified in association with a first selected object, in response to a selection of the user on the position map information. For example, when the user selects (hereinafter, a first selection) a predetermined object within position map information, the display controller 130 may locate, on the screen of the terminal, at least one item of picture information classified to include the first selected object and thereby enables the picture information to be viewed by the user.

In addition, the display controller 130 may display second selected picture information on the whole screen in response to a selection of the user on the displayed picture information. For example, separate from edited picture information broadcasted from a broadcasting station, the display controller 130 enables the user to actively view picture information captured based on the object selected by the user.

When a second selection of the user on picture information displayed on the screen is absent during a predetermined period of time, the display controller 130 may display, on the screen, edited picture information broadcasted from the broadcasting station. That is, the display controller 130 may display edited picture information, unilaterally provided from the broadcasting station, on the whole screen or on a remaining portion of the screen excluding an area on which the picture information and the map information are displayed until the selection of the user on the displayed picture information occurs.

Figure 3:
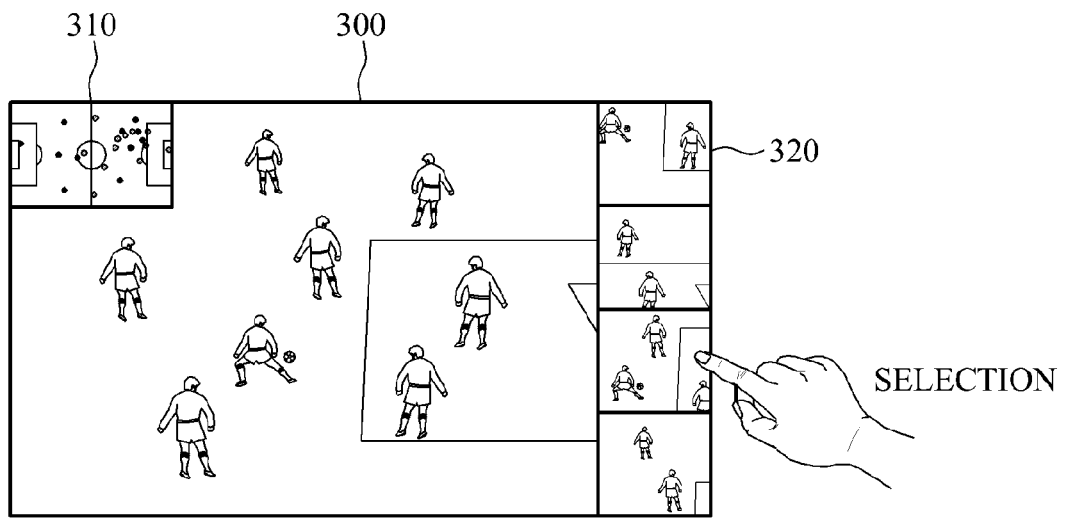
FIG. 3 is a diagram illustrating an example of displaying, on a screen, position map information and picture information including a first selected object.

FIG. 3 is a diagram illustrating an example of displaying, on a screen, position map information and picture information including a first selected object.

FIG. 3 illustrates a screen configuration in a case in which a user selects a predetermined object, for example, player A from among objects belonging to group I that is classified based on red.

As illustrated in FIG. 3, a terminal screen 300 may refer to a display apparatus, for example, a television (TV), capable of displaying edited picture information broadcasted from a broadcasting station so that a user may view edited picture information.

Position map information 310 is displayed on one side of the terminal screen 300, and a plurality of items of picture information 320 according to a first selection of the user are displayed on another side of the terminal screen 300. For example, when the user selects a predetermined object, for example, player A within the position map information 310, the display controller 130 may call all of the plurality of items of picture information 320 including the selected object, for example, player A, and may display the picture information 320 on the terminal screen 300 and then wait for a selection of the user (hereinafter, a second selection).

The picture information 320 including the selected object, for example, player A may be displayed to be distinguished from the position map information 310. Referring to FIG. 3, four items of picture information 320 are arranged on a side of the terminal screen 300 opposite to a side on which the position map information 310 is displayed and thereby are displayed.

When the second selection of the user is performed with respect to the plurality of items of the picture information 320 displayed, for example, when third picture information is selected, the display controller 130 may display the selected picture information on all of or a remaining portion of the terminal screen 300 excluding an area on which the position map information 310 and the picture information 320 are displayed.

As described above, according to an embodiment of the present invention, the user may select picture information of an object desired to be viewed by the user and thereby continuously view the selected picture information.

According to another embodiment of the present invention, the user selectable picture displaying system 100 may identify picture information including an object pre-selected by the user, and may display the identified picture information on the terminal screen 300.

To this end, the user selectable picture displaying system 100 may further include a picture extractor 140.

The picture extractor 140 may identify picture information including a first selected object from among a plurality of items of picture information that are generated using a plurality of cameras. That is, the picture extractor 140 may selectively identify only picture information that includes a predetermined object pre-selected by the user. Here, the picture extractor 140 may enhance the overall processing rate by omitting an operation of extracting all of the objects from picture information.

The position tracker 120 may generate position map information by tracking a position of the first selected object using the identified picture information.

The display controller 130 may display position map information on at least a portion of a screen, and may also display the identified picture information on the screen together with the position map information. When a second selection of the user on the displayed picture information is received, the display controller 130 may display the selected display information on a remaining portion of the screen excluding an area on which the picture information and the position map information are displayed. Depending on embodiments, the display controller 130 may display the second selected picture information on the whole screen.

An operation of the position tracker 120 and the display controller 130 in relation thereto will be similar or identical to the aforementioned embodiment and thus, a further detailed description will be omitted here.

According to an embodiment of the present invention, a right of a user to select a picture may be maximally guaranteed by selecting picture information, which is generated by photographing an object predestinated by the user and thereby displaying the selected picture information to be small on the screen, and by displaying predetermined picture information determined by the user through a screen selection to be large on the screen.

Hereinafter, an operation of a system for displaying a user selectable picture according to an embodiment of the present invention will be described.

Figure 4:
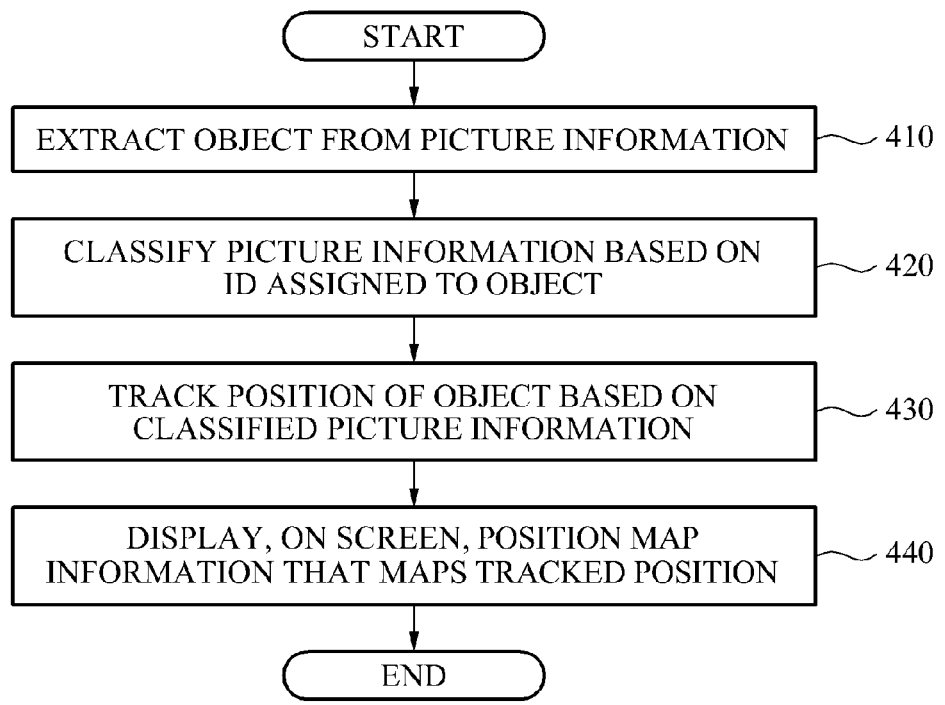
FIG. 4 is a flowchart illustrating a method of displaying a user selectable picture according to an embodiment of the present invention.

FIG. 4 is a flowchart illustrating a method of displaying a user selectable picture according to an embodiment of the present invention.

The user selectable picture displaying method according to the present embodiment may be performed by the aforementioned user selectable picture displaying system 100.

In operation 410, the user selectable picture displaying system 100 may extract an object from picture information that is generated using a plurality of cameras. Operation 410 is a process of identifying an object included in picture information. In particular, the user selectable picture displaying system 100 may maximally prohibit unnecessary use of resources for extracting an object by selectively extracting, from picture information, only an object having a value as information in operation 410.

According to another embodiment, the user selectable picture displaying system 100 may identify picture information including a first selected object from among a plurality of items of picture information that are generated using a plurality of cameras in operation 410. That is, the user selectable picture displaying system 100 may selectively identify only picture information including a predetermined object that is pre-selected by the user. In this case, the user selectable picture displaying system 100 may enhance the overall processing rate by omitting an operation of extracting all of the objects from picture information.

In operation 420, the user selectable picture displaying system 100 may assign an ID to the extracted object, and may classify the picture information based on the assigned ID. Operation 420 is a process of sorting a plurality of items of picture information for each object.

According to another embodiment, the user selectable picture displaying system 100 may directly classify the identified picture information for each object in operation 420. In this instance, the user selectable picture displaying system 100 may perform classification processing by sorting picture information based on a time at which corresponding picture information is generated. In addition, the user selectable picture displaying system 100 may assign an individual ID to object information extracted from a plurality of items of picture information, and may perform classification processing by sorting picture information based on information of the individual ID.

In operation 430, the user selectable picture displaying system 100 may track a position of the object using the classified picture information. Operation 430 is a process of sorting the classified picture information for each time at which corresponding picture information is generated or for each ID assigned to the object, specifying position coordinates of the object with respect to each of the sorted picture information based on a photographing point of a camera, and tracking the position of the object based on the specified position coordinates. In operation 430, the user selectable picture displaying system 100 may generate position map information about the position of the object.

Further, in operation 430, the user selectable picture displaying system 100 may track the position of the object based on position information input from a position tracking apparatus attached to each object.

Depending on embodiments, the user selectable picture displaying system 100 may track the position of the object by classifying the object based on color that is determined in consideration of a group including the object in operation 430. That is, the user selectable picture displaying system 100 may track a position of each object by classifying a plurality of objects for each group, and by identifying an object based on color assigned to each group.

In operation 440, the user selectable picture displaying system 100 may display, on at least a portion of the screen, position map information that maps the tracked position. Operation 440 is a process of displaying a real-time position relationship between objects on the screen as position map information. The position map information may be displayed on the screen in a PIP form or a screen split form.

Therefore, according to an embodiment of the present invention, a user is enabled to clearly view a position of an object that the user desires to monitor by generating position map information about current positions of objects and by displaying the generated position map information on a screen of a terminal viewed by the user.

According to an expanded embodiment, the user selectable picture displaying method may display, on at least another portion of the screen, picture information that is classified in association with a first selected object, in response to a selection of the user on the position map information. For example, when a first selection of the user within position map information is made, the user selectable picture displaying system 100 may locate, on the screen of the terminal, at least one item of picture information classified to include the first selected object and thereby enables the picture information to be viewed by the user.

In addition, the user selectable picture displaying system 100 may display second selected picture information on all of or a portion of the screen in response to a selection of the user on the displayed picture information. For example, separate from edited picture information broadcasted from a broadcasting station, the user selectable picture displaying system 100 enables the user to actively view picture information captured based on the object selected by the user.

When a second selection of the user on picture information displayed on the screen is absent during a predetermined period of time, the user selectable picture displaying system 100 may display, on the screen, edited picture information broadcasted from the broadcasting station. That is, the user selectable picture displaying system 100 may display edited picture information, unilaterally provided from the broadcasting station, on the whole screen or on a remaining portion of the screen excluding an area on which the picture information and the map information are displayed until the selection of the user on the displayed picture information occurs.

Through this, according to embodiments of the present invention, the user may select picture information of an object desired to be viewed by the user and thereby continuously view the selected picture information.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to embodiments of the present invention, it is possible to enable a user to select a predetermined object from a picture of a camera relayed in real time, and to select and thereby view a relay picture that includes the selected object.

According to embodiments of the present invention, it is possible to enable a user to select an object that the user desire to view and also possible to enable a selection of a picture including the selected object to be smoothly performed by tracking a position of each of objects that are included in a picture, and displaying the tracked positions on a screen in real time.

According to embodiments of the present invention, it is possible to enable a user to view picture information actively selected by the user, instead of viewing edited picture information unilaterally broadcasted from a broadcasting station, and thereby maximally guarantee a screen selection of the user.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of displaying a user selectable picture, the method comprising:
    extracting an object from picture information that is generated using a plurality of cameras;
    assigning an identifier (ID) to the extracted object;
    classifying the picture information based on the assigned ID;
    tracking a position of the object based on the classified picture information;
    displaying, on at least a portion of a screen, position map information that maps the tracked position; and
    displaying picture information classified in association with a first selected object on at least another portion of the screen, in response to a selection of a user on the position map information;
    wherein the displaying the picture information comprises displaying a plurality of items of picture information containing the first selected object, and waiting for a second selection by the user from among the displayed plurality of items of picture information.

2. The method of claim 1, further comprising:
    displaying second selected picture information on the whole screen in response to the second selection of the user on the displayed picture information.

3. The method of claim 1, further comprising:
    displaying edited picture information that is broadcasted from a broadcasting station, on a remaining portion of the screen excluding an area on which the picture information and the position map information are displayed, until the selection of the user on the displayed picture information is received.

4. The method of claim 1, wherein the displaying comprises displaying the position map information on the screen in a picture in picture (PIP) form or a screen split form.

5. The method of claim 1, wherein the tracking comprises:
    sorting the classified picture information for each time at which corresponding picture information is generated or for each ID assigned to the object;
    specifying position coordinates of the object with respect to each of the sorted picture information based on a photographing point of a camera; and
    tracking the position of the object based on the specified position coordinates.

6. The method of claim 1, wherein the tracking comprises:
    tracking the position of the object by classifying the object.

7. A method of displaying a user selectable picture, the method comprising:
    identifying picture information comprising a first selected object from among a plurality of items of picture information that are generated using a plurality of cameras;
    tracking a position of the first selected object based on the identified picture information;
    displaying, on at least a portion of a screen, position map information that maps the tracked position;
    displaying identified picture information classified in association with the first selected object on at least another portion of the screen, in response to a selection of a user on the position map information; and
    displaying second selected picture information on a remaining portion of the screen excluding an area on which the picture information and the position map information are displayed, in response to a second selection of the user on the displayed picture information.

8. A system for displaying a user selectable picture, the system comprising:
    an object extractor to extract an object from picture information that is generated using a plurality of cameras;
    a position tracker to assign an identifier (ID) to the extracted object, to classify the picture information based on the assigned ID, and to track a position of the object based on the classified picture information; and
    a display controller to display, on at least a portion of a screen, position map information that maps the tracked position;
    wherein the display controller performs displaying of picture information classified in association with a first selected object on at least another portion of the screen, in response to a selection of a user on the position map information; and the displaying the picture information comprises displaying a plurality of items of picture information containing the first selected object, and waiting for a second selection by the user from among the displayed plurality of items of picture information.

9. The system of claim 8, wherein the display controller displays second selected picture information on the whole screen in response to the second selection of the user on the displayed picture information.

10. The system of claim 8, wherein the display controller displays edited picture information that is broadcasted from a broadcasting station, on a remaining portion of the screen excluding an area on which the picture information and the position map information are displayed, until the selection of the user on the displayed picture information is received.

11. The system of claim 8, wherein the display controller displays the position map information on the screen in a picture in picture (PIP) form or a screen split form.

12. The system of claim 8, wherein the position tracker sorts the classified picture information for each time at which corresponding picture information is generated or for each ID assigned to the object, specifies position coordinates of the object with respect to each of the sorted picture information based on a photographing point of a camera, and tracks the position of the object based on the specified position coordinates.

13. The system of claim 8, wherein the position tracker tracks the position of the object by classifying the object.

14. A system for displaying a user selectable picture, the system comprising:
- a picture extractor to identify picture information comprising a first selected object from among a plurality of items of picture information that are generated using a plurality of cameras;
- a position tracker to track a position of the first selected object based on the identified picture information; and
- a display controller to display, on at least a portion of a screen, position map information that maps the tracked position, and to display identified picture information classified in association with the first selected object on at least another portion of the screen, in response to a selection of a user on the position map information;
- wherein the display controller displays second selected picture information on a remaining portion of the screen excluding an area on which the picture information and the position map information are displayed, in response to a second selection of the user on the displayed picture information.

* * * * *